United States Patent
Basson et al.

(12)

(10) Patent No.: US 6,319,431 B1
(45) Date of Patent: Nov. 20, 2001

(54) PRESERVATIVE AND FIRE RETARDANT COMPOSITION AND COMBINATION AND PROCESS

(75) Inventors: Gabriel Richter Basson, Silverton; Wilhelm Eduard Conradie, Meyerspark, both of (ZA)

(73) Assignee: Futuratec CC, Bramley View (ZA)

( * ) Notice: Subject to any disclaimer, the term of this patent is extended or adjusted under 35 U.S.C. 154(b) by 0 days.

(21) Appl. No.: 09/378,714

(22) Filed: Aug. 23, 1999

(51) Int. Cl.$^7$ .............................. C09K 21/02; C09K 21/04
(52) U.S. Cl. ...................... 252/607; 252/601; 252/603
(58) Field of Search ....................... 252/601, 603, 252/607

(56) References Cited

U.S. PATENT DOCUMENTS

| | | | |
|---|---|---|---|
| 2,935,471 | * 5/1960 | Aarons | 252/601 |
| 3,784,356 | 1/1974 | Wagner | 8/196 |
| 4,072,473 | * 2/1978 | Radkowski et al. | 44/511 |
| 4,427,745 | 1/1984 | Pearson | 428/524 |
| 4,442,157 | * 4/1984 | Marx et al. | 428/173 |
| 4,451,301 | 5/1984 | Mueller | 148/6.15 R |
| 4,539,235 | 9/1985 | Collins et al. | 427/440 |
| 4,663,239 | 5/1987 | Pearson | 428/524 |
| 5,151,225 | * 9/1992 | Herndon et al. | 252/607 |
| 5,162,394 | 11/1992 | Trocino et al. | 523/208 |
| 5,389,309 | * 2/1995 | Lopez | 252/606 |
| 5,567,292 | 10/1996 | Madabhushi et al. | 204/451 |

FOREIGN PATENT DOCUMENTS 674904   7/1979   (RU) .
932831   1/1994   (ZA) .

OTHER PUBLICATIONS

002013389 WPI Acc No.: 78–26415A/14 (Abstract); Feb. 24, 1978, JP 53020402.
003998982 WPI Acc No.: 84–144524/23 (Abstract); SU 1041289A, Dec. 14, 1984.
000953436 WPI Acc No.: 73–30680U/22 (Abstract); US 3,784,356, Jan. 8, 1974.

* cited by examiner

*Primary Examiner*—Jill Warden
*Assistant Examiner*—LaToya Cross
(74) *Attorney, Agent, or Firm*—Birch, Stewart, Kolasch & Birch, LLP

(57) ABSTRACT

An aqueous treatment composition for cellulosic material comprises an aqueous fire retardant solution of urea $(CO(Na_2)_2$, a source of inorganic acid groups such as phosphoric acid, monoammonium phosphate or diammonium phosphate, a water miscible alcohol such as methanol or ethanol, and an inorganic borate, typically a mixture of boric acid and borax pentahydrate. The treatment composition may be provided in a concentrated or water-free form, in which case the treatment composition is formulated into an aqueous fire retardant and preservative solution at the point of use. The treatment composition can be prepared from a kit containing the various components in two separate containers. Also provided is a method of simultaneously improving the resistance to heat and/or fire and preserving a cellulosic material comprising treating the cellulosic material with a treatment composition of the invention. The cellulosic material that can be treated includes timber based materials such as wood, wood derivatives and processed wood, for example, as well as non-timber based materials such as thatching grass, bamboo, reed and palm leaves and the like.

9 Claims, No Drawings

PRESERVATIVE AND FIRE RETARDANT COMPOSITION AND COMBINATION AND PROCESS

BACKGROUND OF THE INVENTION

THIS invention relates to a preservative and fire retardant composition and combination and process.

Cellulosic materials, typically wood and wood derivatives, such as cardboard and products comprising them, need to be protected against the risk of fire and against biological degradation as a result of decay caused by fungi and attack by insects such as wood borers and termites. Borates in low concentrations have been used as wood preservatives as they provide wide-spectrum protection against organisms causing wood degradation. Borates in high concentrations have also been used to treat wood against fire. However, the use of high concentrations of borates is expensive and uneconomical. Also, borates have a relatively low solubility in aqueous solvents and it is therefore difficult to formulate a suitable composition for impregnation. Borates are also leachable from wood and other cellulosic materials which can result in their loss from treated cellulosic materials when they are exposed to continuous wet conditions, in particular free water.

Other cellulosic materials such as thatching grass, reeds, bamboo and palm leaves are also used in roof and wall construction. These also need to be protected against the risk of fire and against biological degradation. However, to date the treatment of such materials has posed problems because the waxy and/or protective coating on the surface of such materials precludes sufficient penetration of treatment materials.

SUMMARY OF THE INVENTION

According to one aspect of the invention all aqueous treatment composition for cellulosic material comprises an aqueous fire retardant solution of urea ($CO(NH_2)_2$, a source of inorganic acid groups, a water miscible alcohol and an inorganic borate.

According to a further aspect of the invention a concentrated treatment composition for cellulosic material comprises an aqueous fire retardant solution of urea ($CO(NH_2)_2$), a source of inorganic acid groups, a water miscible alcohol and an inorganic borate, which are present in the following amounts:

| | |
|---|---|
| water | 100 to 180 g/kg; |
| urea | 270 to 560 g/kg; |
| inorganic acid | 90 to 150 g/kg; |
| water miscible alcohol | 30 to 75 g/kg; |
| inorganic borate | 180 to 440 g/kg. |

The urea is preferably present in an amount of 310 to 500 g/kg.

The water is preferably present in an amount of 120 to 160 g/kg.

The source of inorganic acid groups is preferably phosphoric acid. The phosphoric acid is preferably present in an amount of 100 to 130 g/kg.

The source of inorganic acid groups may also be monoammonium phosphate (MAP) ($NH_4H_2PO_4$) or diammonium phosphate (DAP). If MAP is used, it is preferably present in substantially the same amounts given for phosphoric acid mentioned above. The MAP used is typically at 100% purity and therefore contains about 82,565% $PO_4$.

The water miscible alcohol is preferably ethanol. The ethanol is preferably present in an amount of 35 to 65 g/kg, more preferably 40 to 60 g/kg.

The inorganic borate may be boric acid ($H_3BO_3$) or sodium borate ($Na_2B_4O_7$) or both. It is preferably a mixture of boric acid and sodium borate. In the mixture of boric acid and sodium borate, the boric acid is preferably present in an amount of 110 to 270 g/kg, more preferably 130 to 240 g/kg and the sodium borate is preferably present in an amount of 70 to 170 g/kg, more preferably 80 to 150 g/kg.

According to another aspect of the invention a treatment kit for cellulosic material comprises a first container containing a water miscible alcohol; and a second container containing an inorganic borate, the first container and/or the second container additionally containing urea and/or a source of inorganic acid groups, provided that if the urea or the source of inorganic acid groups are in a liquid form they are contained in the first container and if they are in a dry form, they are contained in the second container, the contents of the second container, dissolved in water if necessary, being miscible with the contents of the first container to form an aqueous treatment composition for cellulosic material.

A preferred treatment kit for cellulosic material comprises:

a first container containing an aqueous fire retardant solution of urea, a source of inorganic acid groups and a water miscible alcohol; and a second container containing an inorganic borate, the contents of the second container being miscible with the contents of the first container to produce an aqueous treatment composition for application to the cellulosic material.

The contents of the second container are soluble in water.

The inorganic borate may be boric acid ($H_3BO_3$) or sodium borate ($Na_2B_4O_7$) or both.

It is preferably a mixture of boric acid and sodium borate.

The aqueous treatment composition preferably contains 1 part boric acid equivalent (mass per volume) of boric acid, sodium borate or both to 2.5 to 5 parts aqueous fire retardant solution (volume per volume).

The treatment composition and the second container preferably contain both boric acid and sodium borate as a dry salts mixture.

The sodium borate is preferably in the form of a borax pentahydrate ($Na_2B_4O_7 5H_2O$).

The dry salts mixture preferably contains about 940 g per kg of boric acid equivalent.

The dry salts mixture may contain from about 465 to 775 g per kg of boric acid and from about 285 to 475 g per kg of borax pentahydrate.

The dry salts mixture preferably contains from about 590 to 650 per kg of boric acid and 360 to 400 g per kg of borax pentahydrate.

The source of inorganic groups is preferably a water soluble source of phosphate groups.

The water soluble source of phosphate groups may be phosphoric acid or monoammonium phosphate.

The phosphoric acid may be present in the aqueous treatment composition or in the aqueous fire retardant solution in the first container in an amount of from 75 to 125 g per liter, preferably from 90 to 110 g per liter.

The urea may be present in the aqueous treatment composition or in the aqueous fire retardant composition in the first container in an amount of from 300 to 500 g per liter, preferably from 360 to 440 g per liter.

The water soluble alcohol is preferably a non-polymerisable alcohol.

The water soluble alcohol may be ethyl alcohol or methyl alcohol, preferably ethyl alcohol.

The ethyl alcohol is preferably present in the aqueous treatment composition or in the aqueous fire retardant solution in the first container in an amount of from 35 to 65 g per liter, preferably from 45 to 55 g per liter.

A further preferred treatment kit for cellulosic material comprises:
- a first container containing a source of inorganic acid groups and a water miscible alcohol; and
- a second container containing an inorganic borate and urea, the contents of the second container being soluble in water and the contents of the first container being miscible with the contents of the second container dissolved in water in a ratio of 0.1 to 0.4:1 (volume per mass) to form a treatment composition for cellulosic material.

The ratio is preferably 0.15 to 0.30:1 (volume per mass).

The source of inorganic acid groups is preferably phosphoric acid. The phosphoric acid is preferably present in an amount of 500 to 910 g/kg, preferably 600 to 800 g/kg.

The water miscible alcohol is preferably ethanol. The ethanol is preferably present in an amount of 200 to 410 g/kg, preferably 240 to 360 g/kg.

The urea is preferably present in an amount of 370 to 810 g/kg, more preferably 450 to 720 g/kg.

The inorganic borate may be boric acid or sodium borate. It is preferably a mixture of boric acid and sodium borate. In the mixture of boric acid and sodium borate, the boric acid is preferably present in an amount of 160 to 390 g/kg, more preferably 190 to 340 g/kg and the sodium borate is preferably present in an amount of 100 to 240 g/kg, preferably 120 to 210 g/kg.

Yet another preferred treatment kit for cellulosic material comprises:
- a first container containing a water miscible alcohol; and
- a second container containing an inorganic borate, urea and a source of inorganic acid groups in a salt form.

The source of inorganic acid groups in a salt form in the third treatment kit is preferably MAP.

The MAP is preferably present in an amount of 80 to 200 g/kg, more preferably 100 to 180 g/kg.

The water miscible alcohol is preferably ethanol. The ethanol is preferably present in an amount of 30 to 90 g/kg, more preferably 40 to 80 g/kg. This is typically packed in a leak proof second container at the required quantity needed for the amount of dry salts in the first container.

The urea is preferably present in an amount of 330 to 790 g/kg, more preferably 390 to 730 g/kg.

The inorganic borate may be boric acid or sodium borate. It is preferably a mixture of boric acid and sodium borate. In the mixture of boric acid and sodium borate, the boric acid is preferably present in an amount of 110 to 260 g/kg, more preferably 130 to 240 g/kg and the sodium borate is preferably present in an amount of 70 to 160 g/kg, more preferably 80 co 150 g/kg.

According to another aspect of the invention a method of simultaneously improving the resistance to heat and/or fire and preserving a cellulosic material comprises the step of treating the cellulosic material with an aqueous treatment composition as described above or an aqueous treatment composition derived from a concentrated treatment composition as described above.

The cellulosic material is preferably a timber based cellulosic material selected from wood, wood derivatives and processed wood, or a non-timber based cellulosic material selected from thatching grass, bamboo, reed and palm leaves, cane, products derived from cane, bamboo-like plants, grasses, cereal plants, sisal, jute, hemp, elangalong and elangalong-like plants.

The cellulosic material may be impregnated with the treatment composition. In the case of timber based cellulosic material it may be impregnated under conditions of raised pressure and/or temperature or by diffusion. In the case of non-timber based cellulosic material it can be impregnated under vacuum or pressure or both.

According to another aspect of the invention there is provided cellulosic material treated by a method of the invention.

DESCRIPTION OF THE INVENTION

In one embodiment of the invention, the aqueous treatment composition of the invention, when applied to cellulosic material such as wood, particularly timber, and wood derivatives, such as paper and cardboard, provides long term or permanent and wide spectrum protection against biological attack and degradation, such as fungal decay and wood destroying insects, and also imparts a high degree of fire retardation. The aqueous treatment composition contains a combination of an aqueous fire retardant solution and a preservative in the form of boric acid or sodium borate or a mixture of the two. The borate component also acts as a fire retardant and complements the fire retardant action of the aqueous fire retardant solution.

The fire retardant is typically formulated as an aqueous solution containing urea, phosphoric acid and ethanol while the preservative component is formulated as a dry salts mixture of boric acid and borax pentahydrate, blended to provide the optimum solubility of both components in water. The two can be combined in a treatment kit for admixture to form a stable solution, which constitutes the aqueous treatment composition of the invention, prior to application to cellulosic material. The treatment kit comprises a first container containing the aqueous fire retardant solution and a second container containing the boric acid and borax pentahydrate dry salts mixture.

The preferred ranges of boric acid and borax pentahydrate in the dry salts mixture are:

| | |
|---|---|
| boric acid | 590 to 650 g per kg |
| borax pentahydrate | 360 to 400 g per kg. |

The aqueous treatment composition, when prepared from a treatment kit containing the borate salts and the fire retardant solution in two separate containers, is mixed and applied as follows in a pressure treatment plant. A mixing tank is filled with water to approximately 75% of the working solution volume required. The borate salts are added and mixed until all salts have dissolved. The aqueous fire retardant solution is then added while continuously mixing the contents of the tank. The concentration of the active ingredients in the aqueous treatment composition is adjusted finally by the addition of water to obtain the required active ingredients concentration.

Upon formulation of the aqueous treatment composition, the cellulosic material, typically seasoned or semi-seasoned timber, is treated by conventional impregnation processes to obtain at least the following nett retention levels:

| | |
|---|---|
| boric acid equivalent | 5 kg per m³ |
| fire retardant solution | 25 liters per m³. |

Conventional pressure impregnation processes are, for example, full-cell and empty-cell processes.

The fire retardant solution and the dry salts mixture of boric acid and borax pentahydrate can also be pre-mixed to provide a ready-to-use aqueous treatment concentrate composition. This is contained in a single container system or kit. The single container system containing the pre-mixed aqueous treatment composition in concentrate form contains 1 part boric acid equivalent (m/v) of boric acid, sodium borate or both to 5 parts aqueous fire retardant solution (v/v). To ensure a stable solution concentrate in water, the pre-mixed solution concentrate is formulated as follows:

| | |
|---|---|
| boric acid equivalent (borate salts) | 30 to 70 g/l |
| fire retardant solution | 150 to 350 ml/l. |

The preferred ranges are as follows:

| | |
|---|---|
| boric acid equivalent (borate salts) | 40 to 60 g/l |
| fire retardant solution | 200 to 300 ml/l. |

The pre-mixed concentrate composition is prepared by firstly dissolving the required mass of borate dry salts mixture in a predetermined volume of water and then blending in the appropriate volume of aqueous fire retardant solution. The resulting pre-mixed concentrate has a relatively low active ingredients (borate wood preservative and fire retardant) concentration in water.

The pre-mixed concentrate is formulated for use by adding the contents of a required number of containers into a mixing tank. Flushing each container with water, adding that water to the contents of the mixing tank and adjusting the aqueous treatment composition by the addition of further water to obtain the required active ingredients concentration in the solution. Wood and wood derivative products to be treated are then impregnated with the composition and the required nett retention levels are the same as those described above when using the two container treatment kit.

The aqueous treatment composition of this embodiment of the invention, whether prepared from a kit containing the fire retardant solution and the borate salts in separate containers or from a pre-mixed concentrate can be used to treat cellulosic products, typically timber, by means of a diffusion treatment process. Timber, typically green (freshly cut) timber, is submersed in a tank containing a concentrated solution of the aqueous treatment composition of the invention heated to a temperature of about 60° C. for a period of time to ensure adequate absorption of the aqueous treatment composition—i.e. a boric acid equivalent nett retention of at least 5 kg per m³ and a fire retardant solution nett retention of 25 l per m³. The concentration of the active ingredients in this concentrated aqueous treatment composition used in this method of impregnation is about 100 to 150 g boric acid equivalent per liter and 500 to 750 ml of fire retardant solution per liter.

The dip-treated timber is then close-stacked and completely covered, to ensure that the wood moisture is retained, for a period of time until the required depth of penetration of the active ingredients into the timber is achieved by diffusion.

The fire retardant solution is a solution of phosphoric acid ($H_3PO_4$) at 85% purity, urea at 46% available nitrogen and ethanol in water, the phosphoric acid and the urea being the active fire retardant ingredients. The solution is in the form of a concentrate of C.A. 500 g per liter active fire retardant ingredients. It has the following physical characteristics:

| | |
|---|---|
| appearance | clear liquid |
| density at 20° C. | 1,16 kg per litre |
| pH at 100 g/litre | ±2.5 |
| compatibility | stable in borate solutions. |

The dry salts mixture has active ingredients in the amount of C.A. 940 g per kg boric acid equivalent. It has the following physical characteristics:

| | |
|---|---|
| appearance | free flowing white crystalline powder |
| bulk density | 960 kg per m³ |
| pH at 20 g/litre | ±8.0 |
| solubility | ±g per litre in water at 20° C. |

The fire retardant solution is that described in South African patent no. 96/10587, the contents of which are incorporated herein by reference. The alcohol (ethanol) present in this solution assists the penetration of the composition of this embodiment into the cellulosic material by aiding the penetration of the phosphoric acid, urea and borate active ingredients into the cellulosic material during pressure impregnation. Without wishing to be bound by theory, it is believed that the alcohol reacts with some of the phosphoric and boric acids present to form esters rendering the entire aqueous treatment composition less susceptible to leaching by water. The examples below seem to indicate that the combination of the borate components and the fire retardant solution results in a synergism between the two with a compounded reduction in phosphate leachability and borate leachability. It is also believed that the alcohol forms stable ester complexes between the phosphoric acid and boric acid and the cellulose component of the cellulosic material. The esters also, it is believed, form protective chars on exposure to fire and thus reduce the rate of combustion of the treated cellulosic material.

The hygroscopic nature of the treatment composition also assists in retaining water within the cellulosic material. The moisture content of the cellulosic material is thus kept at a higher level which limits moisture fluctuations within the wood when exposed to varying atmospheric relative humidity conditions. This makes the cellulosic material less susceptible to water loss and thus to shrinkage and swelling. The decrease in shrinkage and swelling reduces the development of drying defects such as checking, splitting, warping and cupping. The aqueous treatment composition of the invention contains no sulphates, which are known to reduce wood strength properties.

Instead of being provided in the form of an aqueous composition, the treatment composition can be provided as a highly concentrated composition in a paste form for the treatment of cellulosic material. This highly concentrated paste may be supplied in a single container or in a kit form having two containers, one containing the borate or borates and the other containing the remaining components. A second kit containing the components for the treatment composition but excluding water is also provided. Both the paste and the kit excluding water provide an advantage in that a smaller volume of liquid is packaged and transported, thereby reducing packaging and transport costs. The treatment composition is then formulated into an aqueous fire retardant and preservative solution at the point of use.

The concentrated paste is prepared by either of the following two methods.

1. Boric acid, borax pentahydrate and urea are milled into a fine powder. They are then blended and phosphoric acid, ethanol and water is mixed into them to form a semi-flowable paste.
2. Boric acid, borax pentahydrate and urea are dissolved in phosphoric acid and water at a temperature of 70 to 80° C. The solution is then cooled down to about 40° C. and ethanol is added. The resulting concentrate is also in the form of a semi-flowable paste.

The concentrated paste, which is still semi-flowable and can be handled with relative ease, is diluted with water at the point of treatment by a user. The concentrate is formulated for use by adding the contents of a required number of containers into a mixing tank. Each container is flushed with water and that water is added to the contents of the mixing composition of the tank. The resulting aqueous treatment composition is then adjusted by the addition of further water to obtain the required active ingredient concentration in the solution.

In the second kit system, where water is not included in the components, one container contains dry salt active ingredients in the form of boric acid, borax pentahydrate and urea salts while the other container contains the liquid active ingredients in the form of phosphoric acid and ethanol. The components are present in the various containers in the following ranges:

| | |
|---|---|
| boric acid | 160 to 390 g/kg, preferably 190 to 340 g/kg |
| borax pentahydrate | 100 to 240 g/kg, preferably 120 to 210 g/kg |
| urea | 370 to 810 g/kg, preferably 450 to 720 g/kg |
| phosphoric acid | 500 to 910 g/kg, preferably 600 to 800 g/kg |
| ethanol | 200 to 410 g/kg, preferably 240 to 360 g/kg. |

The treatment composition, when prepared from a treatment kit containing the borate salts and urea and the alcohol and phosphoric acid in two separate containers is mixed as follows. The borate salts and urea are first dissolved in water to approximately 75% of the working solution volume required. The alcohol and phosphoric acid are then added while continually mixing the contents of the tank. The concentration of the active ingredients in the aqueous treatment composition is then adjusted finally by adding water to obtain the required active ingredients concentration. The contents of the first container (borate salts plus urea) is combined with the contents of the second container (phosphoric acid plus alcohol) in a range of about 1:0.1 to 0.4 parts (mass per volume), preferably 1:0.15 to 0.3 parts (mass per volume).

The second treatment kit described above does not contain water. The advantage of this is that a smaller volume of liquid is packaged and transported, thereby reducing packaging and transport costs. Water is added at or just prior to point of use to form the composition into an aqueous fire retardant and preservative solution. The use of MAP or DAP allows for a further reduction in the liquid component of the composition in the concentrated treatment composition and the treatment kit in that the (liquid) phosphoric acid is replaced with a salt.

Thus a third treatment kit in which the second container contains only dry salt active ingredients is provided.

The third treatment kit comprises:
  a first container containing a water miscible alcohol; and
  a second container containing an inorganic borate, urea and a source of inorganic acid groups in a salt form.

The treatment composition, when prepared from a third treatment kit of the invention, is mixed substantially as described when prepared from the second treatment kit as described above. However, each of the borate salts, the urea and the MAP or DAP is first dissolved in water in a mixing tank before the required amount of alcohol is added while continually mixing the content of the mixing tank. The content of the second container (borate salts plus urea plus MAP or DAP) is combined with the content of the first container (alcohol) in a range of about 1:0.03 to 0.11 (mass per volume) preferably 1 part borate salts plus urea plus MAP or DAP (mass per volume): 0.05 to 0.09 parts alcohol (mass per volume).

The concentration of the active ingredients in the aqueous treatment composition can then also be adjusted by adding water to obtain the required active ingredients concentration.

The invention also provides a new method for providing fire protection and protection against biological deterioration caused by decay and insects to cellulosic material selected from the group consisting of wood, wood derivatives, processed wood such as paper, cardboard or press wood, thatching grass, bamboo, reed and palm leaves which are used in roof and wall construction. Although the above embodiments have been described with particular reference to timber based cellulosic material as well as non-timber based cellulosic material selected from thatching grass bamboo, reed and palm leaves, other non-timber cellulosic material call be treated in terms of the new material. The cellulosic material includes any material containing cellulose, cellulose fibers or containing cellulose and lignin or cellulose gum. The non-timber cellulosic material includes the following materials and materials of the same general type and materials derived from them in addition to thatching grass, bamboo, reed and palm leaves.

Cane, such as sugarcane, and other like plants. Products derived from cane, such as bagasse.

Bamboo-like plants, typically plants which haye hollow, usually slender, joined stems.

Any grasses, including any member of the family Gramineae and suitable monocotyladenous plants. Cereal plants and like plants, such as wheat, barley and oats, particularly the stems or stalks of such plants, more particularly straw.

Any palm leaves or wood including coconut and banana palm leaves and wood.

The reed may be any reed or like plant. Examples include Cape reed and papyrus reed.

Sisal, jute, hemp, elangalang and like plants.

Fire protection and protection against biological deterioration is provided by applying a treatment composition comprising an aqueous fire retardant solution of urea, a source of inorganic acid groups, a water miscible alcohol and an inorganic borate to the cellulosic material. The treatment composition can be used as a pre-mixed solution or may be prepared from a two container kit as described herein.

The components in the treatment composition for the non-timber cellulosic materials differ from those for timber based cellulosic materials because the components behave differently in the combustion of different cellulosic materials. Thatching grass and reed has a greater tendency to sustain after-glow, or smouldering than timber. To deal with this, the following changes to the ranges in the composition were made:

1. a greater amount of inorganic borate relative to the other components, i.e. one part (mass per volume) of borate to 2.5 parts (volume per volume) of fire retardant solution were used as opposed to a suitable ratio for treating timber of one part (mass per volume) of borate to 4.7 parts (volume per volume) of the fire retardant solution;

2. a higher phosphoric acid content in the fire retardant solution, i.e. 133 g/l for thatching grass and reed as opposed to 100 g/l for timber treatment.

It has been found that the treatment compositions of the invention are absorbed into cellulosic materials such as thatching grass, reed, bamboo and palm leaves, despite the fact that their exterior surface is covered by an impervious layer which normally prevents the penetration of liquid into the interior thereof. Any composition simply applied to the exterior of these materials is susceptible to being leached by rain and washed off by other forms of free water. The treatment compositions of the invention impregnate into the interior from the open ends of each shaft of material of the thatching grass, reed, bamboo or palm leaves and are therefore resistant to leaching. The treatment composition can be applied to these materials by either vacuum/vacuum or vacuum/pressure/vacuum impregnation in a treatment plant specifically designed for this purpose. These processes give the following advantages.

1. The materials are treated with proper control of treatment composition uptake.

2. Specific active ingredient retention levels can be achieved.

3. The concentration of the treatment solution can be adjusted to suit the uptake capabilities of different materials, such as thatching grass, reed and bamboo.

The treatment of such cellulosic materials including thatching grass, reed and bamboo requires an extended initial vacuum application of treatment composition. This lasts for approximately 20 minutes at full vacuum in order to remove as much air as possible from the interior of the material, through one or both of its ends. This results in a deep penetration of the treatment solution into the material after release of the applied vacuum as the open end of the shaft of relevant material provides the only pathway for liquid entry. Deeper penetration can be achieved by application of hydraulic pressure to force the liquid deeper into the interior spaces of the material.

The compositions of the invention not only provide protection against fire but also protection against fungal decay and insect attack of the cellulosic materials. Also, as each component of the material used for example in a thatch or reed roof has been treated separately as opposed to a post-treatment on the surface, a far greater degree of protection is provided.

In a kit system where water is included in the components, the following composition may be formulated which could be suitable for the treatment of both timber and thatching grass, reed, bamboo and palm leaves. In the first container containing an aqueous fire retardant solution of urea, phosphoric acid and ethanol, the following ranges of components are present:

| | |
|---|---|
| phosphoric acid | 80 to 160 g/l, preferably 90 to 150 g/l |
| urea | 300 to 500 g/l, preferably 360 to 440 g/l |
| ethanol | 35 to 65 g/l, preferably 45 to 55 g/l |
| water | 420 to 720 g/l, preferably 510 to 630 g/l. |

In the second container containing the borates, boric acid and borax pentahydrate are present in the following amounts:

| | |
|---|---|
| boric acid | 465 to 775 g/kg, preferably 560 to 680 g/kg |
| borax pentahydrate | 285 to 475 g/kg, preferably 340 to 420 g/kg. |

In the treatment composition which would be suitable both for timber and for thatch/reed/bamboo/palm the contents of the two containers should be mixed in the following proportions:

1 part borates (mass per volume) to 1.0 to 7.5 parts fire retardant solution (volume per volume), preferably one part borates (mass per volume) to 1.5 to 6.0 parts of fire retardant solution (volume per volume).

The aqueous treatment composition of the invention, being a single composition containing both a fire retardant and a preservative provides both fire retardant and preservative properties to cellulosic material from a single application process—a one step treatment process. The process of the invention is therefore a simple and economic way of treating cellulosic material to afford protection against both fire and biological degradation.

Suitable timber applications for treatment with the treatment composition of the invention are:

timber poles and laths in thatched roofs (non-ground contact applications);

conventional timber housing, wendy houses and dolls houses, timber loft rooms, sub-economic timber dwellings, timber walkways, decks and carports, interior timber paneling, doors and ceilings, structural timber for convention roofs, animal shelters and barns, industrial crating, pallets and boxes for national and international packaging; and timber props in mines.

It has been found that timber treated with the treatment composition of the invention is less susceptible to shrinkage and swelling than either untreated timber or timber treated with borates alone or with copper chrome arsenate (CCA). The treatment composition of the invention stabilises the wood moisture content at a higher level and allows the cellulosic material to resist moisture fluctuations when exposed to various atmospheric relative humidity conditions. The fact that the treatment composition of the invention, in a single application process, provides both fire retardant and wood preservative properties makes it simple and economic to protect timber against both fire and biological degradation, particularly in high risk applications such as timber houses and thatch roof construction.

Tests

1. Purpose

Timber impregnation and leaching tests were done on the aqueous treatment composition of the invention to establish the following:

a. ease of impregnation into timber; and
b. reduction of leachability of the borate component when compared with treatments containing only borates.

2. Materials and Methods

2.1 Wood Samples

Four end-matched test samples measuring 34 mm×72 mm×100 mm in length were prepared from a rough-sawn, air-dried. S.A. Pine board.

Each test sample was end-sealed and numbered.

2.2 Treatment Solutions

Two treatment solutions were prepared as follows:

| PRODUCT | FUNCTIONALITY | CONCEN-TRATION | ACTIVE INGREDIENTS |
|---|---|---|---|
| Mixture of boric acid and sodium borate only | borate preservative | 18.1 g/l | 17 g $H_3BO_3$/l* |
| Aqueous treatment composition of the invention | borate preservative plus fire retardant | 18.1 g/l 85 ml/l | 17 g $H_3BO_3$/L* ±7 g $PO_4^{3-}$/l** |

*$H_3BO_3$ = Boric acid equivalent
**$PO_4^{3-}$ = Phosphate equivalent

2.3 Method

Replicate wood samples were treated by vacuum impregnation (10 minutes full vacuum followed by a further 10 minutes submersion under atmospheric pressure) with each of the above treatment solutions (See 2.2). Treatment results are given under section 3.1.

The test samples were then allowed to air dry to equilibrium moisture content before commencing with the leaching test. The leaching test consisted of immersing each set of samples (i.e. treated with the same treatment solution) in one liter of cold water, vacuum impregnation for 10 minutes at full vacuum and leaving it submersed for 16 hours.

The leaching test water of each treatment was then analysed by a standard titration method and by the reflectoquant system (R.Q.flex) to determine the amount of boric acid equivalent ($H_3BO_3$) and phosphate equivalent ($PO_4^{3-}$) leached. Leaching test results are given under section 3.2.

3. Results

3.1 Treatment test results:
3.1.1 Boric acid equivalent ($H_3BO_3$) content (total for two test samples).

| | Sample mass | | Uptake/ | $H_3BO_3$ | $H_3BO_3$ |
|---|---|---|---|---|---|
| Treatment | Before treatment g | After Treatment G | absorption volume l | mass conc. g/l | mass content G |
| Mixture of boric acid and sodium borarte only | 185,3 | 252,4 | 0,0671 | 17 | 1,1407 |
| Aqueous treatment composition of the invention | 184,5 | 284,8 | 0,1003 | 17 | 1,7051 |

3.1.2 Phosphate equivalent ($PO_4^{3-}$) content (Total for two test samples)

| | Sample mass | | Uptake/ | $PO_4^{2-}$ | $PO_4^{3-}$ |
|---|---|---|---|---|---|
| Treatment | Before treatment g | After Treatment G | absorption volume l | mass conc. g/l | mass content G |
| Mixture of boric acid and sodium borate only | 185,3 | 252,4 | 0,0671 | 0 | 0 |
| Aqueous treatment composition of the invention containing 82,377 g/l $PO_4^{3-}$ | 184,5 | 284,8 | 0,1003 | 7,002 | 0,7023 |

3.2 Leachig test results:
3.2.1 Boric acid equivalent ($H_3BO_3$) content (Total for two test samples).

| | Sample mass | | Leach | | $H_3BO_3$ leached | |
|---|---|---|---|---|---|---|
| Treatment | Before leaching g | After Leaching G | water volume l | Titration result g/l | Mass g | Of total content* % |
| Mixture of boric acid and sodium borate only | 190,2 | 451,0 | 0,7392 | 0,3864 | 0,2856 | 25,0 |
| Aqueous treatment composition of the invention | 196,2 | 447,4 | 0,7488 | 0,3864 | 0,2893 | 17,0 |

*See Table 3.1.1, last column.

3.2.2 Phosphate equivalent ($PO_4^{-3}$) leached (Total for two test samples)

| | Sample mass | | Leach | | $PO_4^{3-}$ leached | |
|---|---|---|---|---|---|---|
| Treatment | Before leaching g | After Leaching G | water volume l | R.Q. Flex result g/l | Mass g | Of total content* % |
| Mixture of boric acid and sodium borate only | 190,2 | 451,0 | 0,7392 | — | — | — |
| Aqueous treatment composition of the invention | 196,2 | 447,4 | 0,7488 | 0,075 | 0,562 | 8,0 |

*See Table 3.1.2, last column

4. Discussion of Results

4.1 Uptake/Absorption

The uptake/absorption results presented in Table 3.1.1 indicate that the aqueous treatment composition of the invention improves the uptake volume achieved under similar impregnation conditions by almost 50 percent (49.5%) when comparted with a mixture of boric acid and sodium borate alone.

This means easier impregnation and reduced processing times which will benefit production both in terms of rate and cost.

4.2 Leachability

From Table 3.2.1 it is evident that the leachability of borates (i.e. $H_3BO_3$ equivalent) is greatly reduced in the case of the aqueous treatment composition of the invention.

The boric acid equivalent ($H_3BO_3$) leached was reduced from 25 percent to 17 percent when compared with borates alone, i.e. a comparative reduction of 32 percent.

In the case of the fire retardant component, only 8 percent of the phosphate equivalent ($PO_4^{3-}$) was leached under similar leaching conditions.

5. Conclusions

Uptake/absorption of the aqueous treatment composition of the invention into timber is improved by almost 50 percent when compared with a treatment comprising borates only.

Leachability of the borate components is reduced by as much as 32 percent when applied in the aqueous treatment composition of the invention as compared to the leachability of borate components when applied alone.

The invention will now be illustrated by way of the following examples.

EXAMPLE 1

Paste Composition for Timber Treatment

Boric acid—148.50 g/kg
Borax pentahydrate—91.13 g/kg
Phosphoric acid—112.50 g/kg
Urea—450.00 g/kg
Ethanol—56.25 g/kg
Water—141.62 g/kg
Total—1000 g/kg.

EXAMPLE 2

Paste Formulation for Treatment of Thatching Grass and Reed

Boric acid—217.00 g/kg
Borax pentahydrate—133.00 g/kg
Phosphoric acid—116.37 g/kg
Urea—350.00 g/kg
Ethanol—43.75 g/kg
Water—139.88 g/kg
Total—1000 g/kg.

EXAMPLE 3

Two Container Aqueous Timber Treatment Kit
Container 1
 Inorganic borate component
Boric acid—620.0 g/kg
Borax pentahydrate—380.0 g/kg
Total—1000 g/kg
Container 2
 Aqueous fire retardant solution
Phosphoric acid—100 g/l
Urea—400 g/l
Ethanol—50 g/l
Water—585 g/l
Total—1135 g/l.

The contents of these two containers are mixed in the following ratios. 1 part of container 1 (inorganic borate component) (mass per volume): 4.7 parts container 2 (aqueous fire retardant solution) (volume per volume).

EXAMPLE 4

Two Container Aqueous Treatment Kit for Thatching Grass and Reed

Container 1
 Inorganic borate component
Boric acid—620.0 g/kg
Borax pentahydrate—380.0 g/kg
Total—1000 g/kg
Container 2
 Aqueous fire retardant solution
Phosphoric acid—133 g/l
Urea—400 g/l
Ethanol—50 g/l
Water—557 g/l
Total—1140 g/l.

The contents of these two containers are mixed in the following ratios. 1 part of container 1 (inorganic borate component) (mass per volume): 2.5 parts container 2 (aqueous fire retardant solution) (volume per volume).

In both the abovementioned examples, i.e. examples 3 and 4, the contents of the different containers are mixed and diluted with water to the required concentration levels before treatment of timber or thatching grass or reed by either vacuum/pressure/vacuum or vacuum/vacuum impregnation or by dip diffusion or any other appropriate impregnation treatment method or process.

EXAMPLE 5

Two Container Water Free Treatment Kit for Timber

Container 1
 Inorganic borate and urea
Boric acid—215.34 g/kg
Borax pentahydrate—132.14 g/kg
Urea—652.52 g/kg
Total—1000 g/kg
Container 2
 Aqueous phosphoric acid and alcohol
Phosphoric acid—666.67 g/kg
Ethanol—333.33 g/kg
Total—1000 g/kg.

The contents of these two containers are mixed in the following ratios. 1 part inorganic borate and urea salt component (mass per volume): 0.24470 part aqueous phosphoric acid and alcohol component (mass per volume).

EXAMPLE 6

Two Container Water Free Treatment Kit for Thatching Grass or Reed

Container 1
 inorganic borate and urea
Boric acid—310.00 g/kg
Borax pentahydrate—190.00 g/kg Urea—500 00 g/kg
Total—1000 g/kg
Container 2
Aqueous phosphoric acid and alcohol
Phosphoric acid—726.77 g/kg
Ethanol—273.23 g/kg
Total—1000 g/kg.

The contents of these two containers are mixed in the following ratios. 1 part inorganic borate and urea salt component (mass per volume): 0.22874 part aqueous phosphoric acid and alcohol component (mass per volume).

In both the abovementioned water free examples, the contents of the different containers are mixed and diluted with water to the required concentration levels before treatment of timber or thatching grass or reed by either vacuum/pressure/vacuum or vacuum/vacuum impregnation or by dip diffusion or any other appropriate impregnation treatment method or process.

The third treatment kit of the invention will now be illustrated by way of the following examples.

EXAMPLE 7

Two Container Water Free Treatment Kit for Timber

Container 1

| Inorganic borate, urea and MAP. | |
|---|---|
| Boric acid | 185.1 g/kg |
| Borax pentahydrate | 113.6 g/kg |
| MAP | 104.3 g/kg |
| Urea | 561.0 g/kg |
| Total | 1000 g/kg |

| Container 2 | |
|---|---|
| Alcohol Ethanol | 70 g. |

The contents of these two containers are mixed in the following ratios. 1 part inorganic borate plus MAP plus urea salt component (mass per volume): 0.07 parts alcohol (mass per volume).

EXAMPLE 8

Two Container Water Free Treatment Kit for Thatching Grass or Reed or Other Non-Timber Cellulosic Material

| Container 1 | |
|---|---|
| Inorganic borate, urea and MAP. | |
| Boric acid | 265.8 g/kg |
| Borax pentahydrate | 162.9 g/kg |
| MAP | 142.6 g/kg |
| Urea | 428.7 g/kg |
| Total | 1000 g/kg |
| Container 2 | |
| Alcohol Ethanol | 54 g |

The contents of these two containers are mixed in the following ratios. 1 part inorganic borate plus MAP plus urea salt component (mass per volume): 0.054 parts alcohol (mass per volume).

In both the abovementioned examples, the contents of the different containers are mixed and diluted with water to the required concentrations before treatment of timber or thatching grass or reed or other non-timber cellulosic material by vacuum/pressure/vacuum or vacuum/vacuum or dip diffusion or any other appropriate impregnation treatment method or process.

What is claimed is:

1. An aqueous treatment composition for cellulosic material comprising an aqueous fire retardant solution of urea ($CO(NH_2)_2$), phosphoric acid as a source of inorganic acid groups and a water miscible alcohol in combination with a preservative, which is an inorganic borate, for the cellulosic material, the combination being such as to inhibit leaching of the inorganic borate when the combination is applied to a cellulosic material thereby prolonging its preservative effect.

2. A composition according to claim 1, wherein the inorganic borate is boric acid ($H_3BO_3$) or sodium borate ($Na_2B_4O_7$) or a mixture of boric acid and sodium borate.

3. A composition according to claim 2, wherein the aqueous treatment composition contains 1 part boric acid equivalent (mass per volume) of boric acid, sodium borate or mixture of boric acid and sodium borate to 2.5 to 5 parts aqueous tire retardant solution (volume per volume).

4. A composition according to claim 2, wherein the sodium borate is in the form of a borax pentahydrate ($Na_2B_4O_7 5H_2O$).

5. A composition according to claim 1, wherein the water soluble alcohol is a non-polymerisable alcohol.

6. A composition according to claim 5, wherein the water soluble alcohol is ethyl alcohol or methyl alcohol.

7. A concentrated treatment composition for cellulosic material comprising an aqueous fire retardant solution of urea ($CO(NH_2)_2$), phosphoric acid as a source of inorganic acid groups and a water miscible alcohol in combination with a preservative, which is an inorganic borate, which are present in the following amounts:
water 100 to 180 g/kg;
urea 270 to 560 g/kg;
phosphoric acid 90 to 150 g/kg;
water miscible alcohol 30 to 75 g/kg;
inorganic borate 180 to 440 g/kg,
the combination being such as to inhibit leaching of the inorganic borate when the combination is applied to a cellulosic material thereby prolonging its preservative effect.

8. A composition according to claim 7, wherein the inorganic borate is boric acid ($H_3BO_3$) or sodium borate ($Na_2B_4O_7$) or a mixture of boric acid and sodium borate.

9. A composition according to claim 7, wherein the water miscible alcohol is ethyl alcohol or methyl alcohol.

* * * * *